May 12, 1959      C. F. KRATZERT      2,885,813

DECOY

Filed June 26, 1958

INVENTOR,
CLIFFORD F. KRATZERT;

BY

ATTORNEY

United States Patent Office 2,885,813
Patented May 12, 1959

2,885,813
DECOY

Clifford F. Kratzert, Downey, Calif.

Application June 26, 1958, Serial No. 744,877

3 Claims. (Cl. 43—3)

The present invention relates to decoys and particularly decoys of the type resembling wild fowl, such as geese, ducks, etc. The present decoy may be used either on land or in the water.

An object of the invention is the provision of an inflatable decoy so constructed and arranged as to hold a stake when the decoy is inflated.

The present decoy is of light weight, may be easily collapsed and folded into small space, and may be inflated by the mouth within a minimum of time and effort.

A further object of the invention is the provision of an inflatable decoy resembling a water fowl, which decoy when inflated with a stake projecting from the body thereof, may be secured by said stake within water or upon the ground so as to always hold the decoy in a proper floating position upon the water without canting sideways.

The present decoy includes an inflatable body formed of rubber, rubberized fabric, plastic, or other material, said material being semi-stiff and preferably not so elastic as to distend in a manner which results in an unnatural appearance in the decoy. I provide within the body an elongated tube which forms a socket for the reception of a stake. This tube pressure engages the stake when the decoy is inflated and thereby frictionally holds the stake in working position.

Other objects include a decoy which is inexpensive in cost of manufacture, attractive in appearance, easily handled or carried, and which is superior to decoys now known to the inventor.

Figure 1:
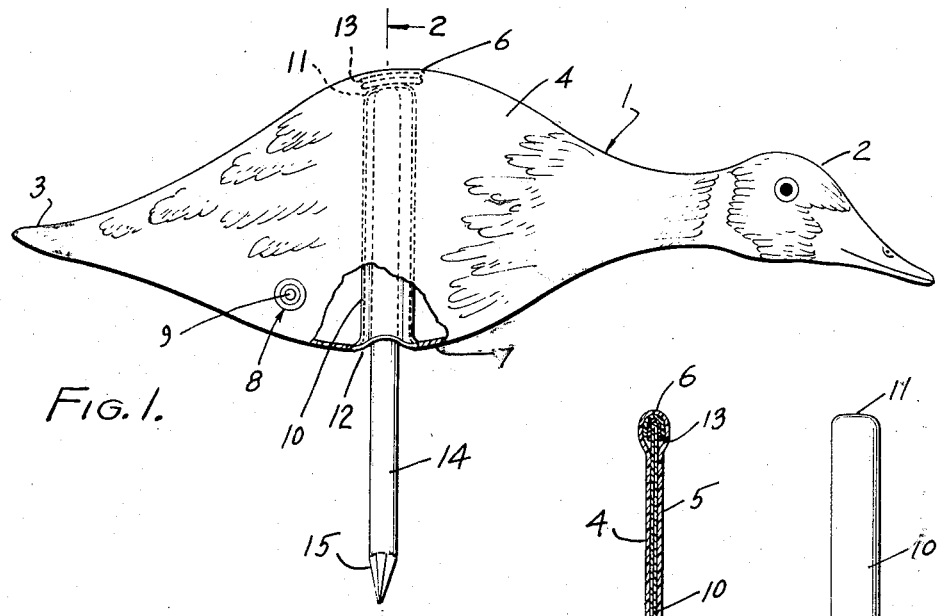
Figure 1 is a fragmentary side elevation, partly in section, showing a decoy embodying the invention.
Figure 2:
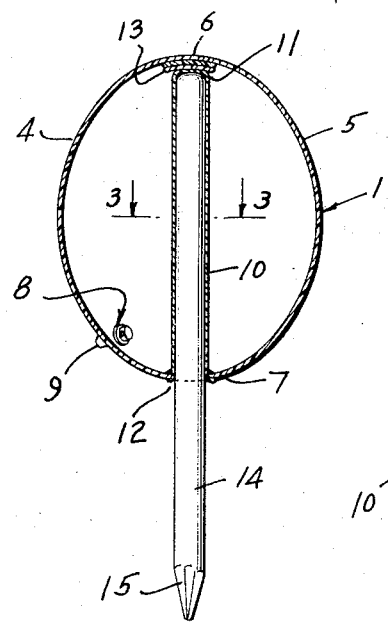
Figure 2 is a sectional view on the line 2—2 of Figure 1.
Figures 5, 6:
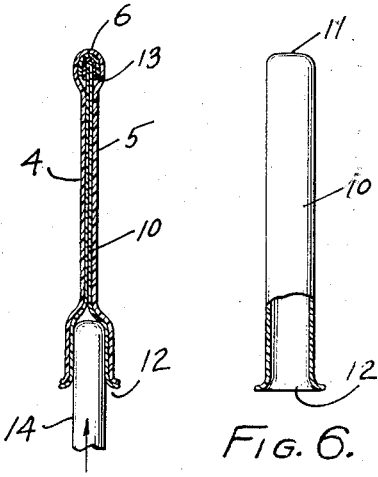
Figure 5 is a fragmentary sectional view showing a stake entering the stake-receiving tube within the decoy, the decoy being deflated.
Figure 6 is a fragmental sectional view of the stake-receiving tube.
Figures 3, 4:
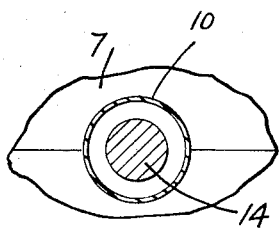
Figure 3 is an enlarged fragmentary sectional view on the line 3—3 of Figure 2.
Figure 4 is a fragmentary sectional view similar to that of Figure 3, the decoy being non-inflated.

The decoy includes a body 1, head 2, and tail portion 3, preferably formed from two identical sheets 4 and 5 which are seamed or otherwise secured together along their marginal top and bottom edges 6 and 7. Preferably the decoy is formed from a material such as plastic, rubberized fabric, rubber, or rubber composition, and it is intended that the materials should be flexible and form-retaining. Thus, the two sheets 4 and 5 should be molded to form so that when the decoy is expanded, it will take the form, for instance, shown in cross section by Figure 2. As is customary, the exterior surface of both sheets are decorated so as to represent feathers as shown in Figure 1. I provide a valve at 8 of a type which will permit air to be blown within the decoy to inflate the same and, by pushing inwardly on the stem 9 of the valve, the valve may be closed after inflation. Valves of this type are on the market and comprise a hollow stem having a conical head slidable within the valve body, which conical head when closed to its seat, prevents loss of air from the decoy, but when the stem is pulled outwardly, releases the air. At approximately the center of gravity of the decoy, I have provided an internal tube 10 which extends from the base of the body to a zone adjacent the back thereof, as shown in Figure 1, at 11. This tube is closed at its inner end and open at the base of the decoy at 12. The tube 10 may be formed of any material desired, such as plastic, rubber or rubber composition, and is collapsible inwardly under external air pressure. Within the decoy body, and at the back thereof, in alignment with the closed end of the tube 10, I have provided one or more pads 13, for the purpose of protecting the closed end of the tube and the decoy back at this portion. A stake of any form, such as shown at 14, and which preferably is pointed at its outermost end 15, and of circular cross section, is adapted to be received within the tube 10. The stake 14 when the decoy body, head and tail are in a non-inflated condition, readily enters this tube, as the tube has a larger internal diameter than the diameter of the stake, as shown in Figure 4. However, when air is blown through the valve 8 to inflate the body, head and tail, the tube 10, due to external pressure thereon, begins to move inwardly against the periphery of the stake 14 and to be in pressure engagement with said stake. This pressure engagement is sufficient to hold the stake tightly within the tube, as, for instance, in the manner shown in Figure 3. As the stake is preferably positioned at the center of gravity of the decoy, it is evident that when the stake is driven into the ground, the decoy will maintain its position without disturbance regardless of waves or wind. It has been found that a decoy should show the head in a feeding position. If the head is up, it is generally understood to be in an alert position and, therefore, other fowl would avoid the particular area occupied by the decoy.

The operation, use, and advantages of the decoy are as follows:

The decoy readily inflates and in so doing pressure grips its anchoring stake, utilizing simple means for this purpose. The decoy when deflated may be folded and carried in a small space for ready use at a blind or other location. Stakes may be provided for each individual decoy with assurance that the stakes will be efficiently held by the decoy. It has been found in actual practice that when a stake is within the tube 10 and the decoy inflated, that it is extremely difficult to withdraw the stake from the said tube.

I claim:

1. A decoy of the water fowl type, including an inflatable body, an elongated flexible tube closed at one end transversely positioned within the body between the back and the base of the body, said tube opening outwardly at said base, a stake for reception within said tube, the said tube being under pressure engagement with the said stake when the said body is inflated.

2. The device as set forth in claim 1 characterized in: that a pad is provided between the body back and the closed end of the tube.

3. A decoy of the water fowl type, comprising a pair of flexible members marginally joined together to form a head, neck, body and tail portion, a flexible tube transversely positioned within the body and extending from the back of said body to the base thereof, said tube being closed at one end adjacent the back and open at the base portion of the body, a valve for said body through which the air may be directed to inflate the body, neck, head and tail portions, and for pressure-collapsing said tube radially.

References Cited in the file of this patent

UNITED STATES PATENTS

| | | |
|---|---|---|
| 2,256,778 | Lundgren | Sept. 23, 1941 |
| 2,736,120 | Lestin | Feb. 28, 1956 |